C. C. & C. B. JONES.
RUNNING GEAR FOR AUTOMOBILES.
APPLICATION FILED APR. 12, 1909.
995,873.
Patented June 20, 1911.
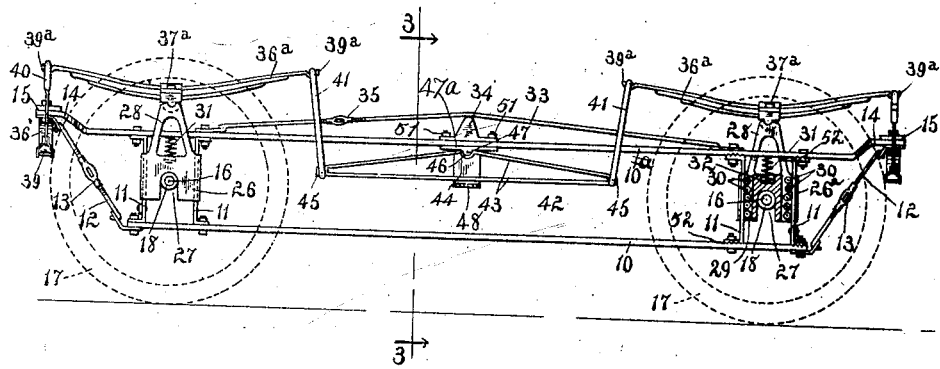
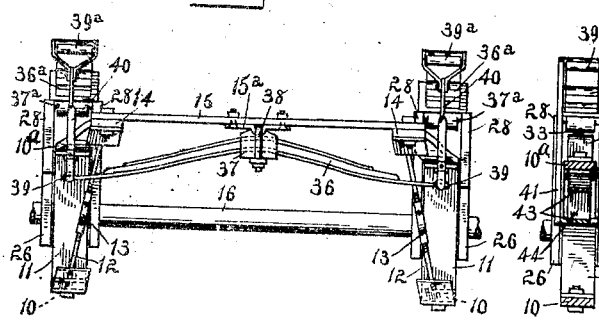
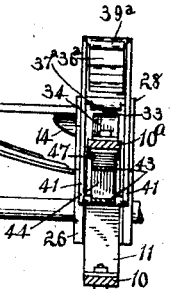
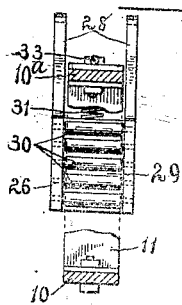
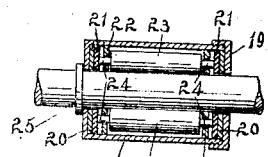
WITNESSES:
M. J. Marty
Chas. F. Barrett
INVENTORS
C. C. Jones
C. Bradney Jones
By Frederick Benjamin
ATT'Y.

UNITED STATES PATENT OFFICE.

CLINTON C. JONES AND CLINTON BRADNER JONES, OF ALBUQUERQUE, TERRITORY OF NEW MEXICO.

RUNNING-GEAR FOR AUTOMOBILES.

995,873.

Specification of Letters Patent. Patented June 20, 1911.

Application filed April 12, 1909. Serial No. 489,453.

*To all whom it may concern:*

Be it known that we, CLINTON C. JONES and CLINTON BRADNER JONES, citizens of the United States, residing at Albuquerque, in the county of Bernalillo and Territory of New Mexico, have invented certain new and useful Improvements in Running-Gear for Automobiles, of which the following is a specification.

Our invention relates to vehicles and refers particularly to running gear especially adapted to be used in automobiles.

The chief objects of the improvements which form the subject matter of this application are:—to provide a suspension device for motor cars that will relieve the vehicle body from excessive shocks and vibrations due to the unevenness in the roads traveled, and thus not only afford an easier riding movement, but also contribute to render the structure more durable and to furnish an improved bearing for the axle that will improve the wearing qualities, reduce friction, and aid the suspension mechanism in absorbing unusual shocks.

Other objects of our invention, stated more in detail are:—to provide a suspension mechanism that can be practically utilized in vehicles of light or heavy construction; to furnish an equalizing device in combination with resilient members so arranged as to coöperate in producing an efficient and practical truss formation particularly adapted to use in high speed cars traveling over common roads, and to supply a take-up mechanism subsidiary to, or that may be substituted for the ordinary take-up commonly used in compensating for the stretch of a chain-drive, when a transmission of this type is employed.

Further objects are to furnish a suspension apparatus in which the suspending and truss members are so related as to produce a structure having a maximum strength combined with a minimum weight of material; and to produce an appliance for the purpose stated that will resist unusual strains, thus rendering the parts less liable to injury from bending or breaking, and conducing to economy in operative expenses.

In order to accomplish the above, and other results of subsidiary importance, we have devised the apparatus illustrated in the accompanying drawing, which forms a part of this application, the details of construction being disclosed in the following views:—

Figure 1 is a side elevation of our improved running gear and suspension apparatus, adapted to be applied to an automobile, the body of the vehicle not being shown, and the relation of the supporting wheels indicated in dotted outlines; Fig. 2 is an end elevation enlarged; Fig. 3 is a sectional view also enlarged taken on the line 3—3 of Fig. 1; Fig. 4 is an enlarged side elevation of one of the frame guides; Fig. 5 is an enlarged longitudinal section of the axle bearing, with a fragment of the axle in engagement therewith; Fig. 6 is an end view of the axle bearing with the axle removed; Fig. 7 is a perspective view of the equalizer casing; Fig. 8 is a transverse section of one of the end spring bearings, and Fig. 9 is an enlarged fragmentary view taken from Fig. 1.

Referring to the details of the drawing the reference characters 10, 10ª, indicate the side members of a frame designed to support the body (not shown) of the vehicle, upon the axles. The lower members 10 extend longitudinally in parallel relation and their ends project beneath and beyond the axles. The upper side members 10ª are arranged vertically above the lower members, and their ends project above and beyond the axles. The upper and lower frame members upon each side are connected by vertical frame pieces 11 securely bolted to the said members and arranged in pairs upon each side of the axles. The extremities of the members 10, 10ª, upon either side are connected by tie rods 12, furnished with turnbuckles 13, by means of which the tension of said rods may be adjusted. The front and rear ends of the upper side members 10ª are offset to raise them to a slightly higher level as indicated at 14, and form supports for the ends of transverse frame members 15, arranged at the front and rear of the structure. Extending transversely beneath the frame are axles 16, supported at their outer ends beyond the frame by ground wheels 17 which are designated by dotted outlines in Fig. 1. These axles are mounted in bearings having anti-friction devices, inclosed in a cylindrical casing 18 (Fig. 5) closed at one end and furnished at the other with a threaded cap 19. Within the cylinder adjacent the ends are metal retaining washers 20, and dirt excluding washers 21, the latter preferably formed of felt or similar material. Each casing contains a pair of duplicate bearing rings or disks 22, between which are arranged a series of roller bearings 23, having their ends reduced to form journals 24, which are supported in an annular series of holes in the bearing rings 22. The casing 18 of each bearing is maintained in proper position on the axle by a retaining collar 25, and is seated in a bearing block 26 having a notch 27 formed in the under side to receive the casing 18. The said bearing block 26 bears upon its upper side a bracket frame comprising parallel members 28, between which pass the upper side frame members 10ª. The front and rear faces of the block 26 are provided with vertical channels 29 in which are arranged series of anti-friction rollers 30, having their ends reduced to form bearings journaled in spaced holes in the sides of said channel. Between the blocks 26 and the upper frame side members 10ª are interposed compression springs 31, having their lower ends engaging sockets 32 in the upper sides of said blocks.

Attached at each end to the upper frame member 10ª on each side is a truss rod 33, supported at its middle on a center-block 34, triangular in shape, and bolted securely to the upper face of the frame member 10ª. A suitable turn-buckle is introduced in said rod 33 to permit of proper tensional adjustment. Extending transversely to the frame at the front and rear are semi-elliptical leaf end springs 36, supported in the median line by suspension clips 37 supported by a U-bolt 38 attached to the under side of the transverse frame members 15, by boxes or clips 15ª. The ends of said springs 36 are suitably formed to engage forks or stirrups 39, attached to the lower ends of hangers 40 suspended from the front and rear ends of side springs 36ª, by stirrups 39ª. To the other end of each side spring is attached a hanger 41, connected to said spring by a fork 39ª and pivoted at its lower end 45 to an equalizer 42, comprising a truss 43, supported in the middle by a block 44. The upper side of this block is furnished with a semi-circular groove to receive a half round bend 46 in the upper member of the truss 43, the concave side being engaged by a boss 47, formed on the under side of a bearing plate 47ª, bolted to the under side of the frame member 10ª directly beneath the center-block 34. The block 44 is secured in position by a casing or hanger 48, having securing flanges 49, provided with bolt holes 50, which are engaged by the bolts 51 which secure the block 34 and the bearing plate 47ª.

It may be desirable to vary the relative position of the driving axle, particularly with a view to adjust the tension of the chain when a transmission of this character is employed. We accomplish this result by providing the contact surfaces between the flanged ends of the vertical frame pieces 11 and the side members 10, 10ª, with suitable corrugations or teeth 52, which interlock and hold the frame rigid without danger of slipping when the bolts are tightened but allow the desired adjustment when loosened, the bolt holes being properly slotted to permit the parts to be moved relatively to each other.

The operation of the frame and equalizing devices to resist shock and produce the desired ease of vibration, is, generally described, as follows:—By inspection of the drawings it will be clear that the entire weight of the frame and body will be borne by the bearing blocks 26, which, in turn, rest upon the roller bearing casing 18. The manner of connecting the various frame members with the semi-elliptical springs 36, 36ª, will allow of the requisite side and end motions to prevent the jarring that would result from a more rigid construction, while the vertical movement of the entire frame with its load is partially regulated by the compression springs 31. The truss member or equalizer 42 being attached in the manner shown to the ends of the side springs, affords a strong construction for the span of the side member 10ª, rendering it sufficiently strong to support proportionally heavy loads, the lower member 10 acting as a tie to coöperate with the superstructure in resisting unusual stresses due to obstructions or irregularities in the road bed traveled over. The anti-friction devices of the said blocks 26 will permit a free vertical movement of the entire frame and its load appreciably resisted only by the elastic members comprising the semi-elliptical leaf springs 36, 36ª, and the shock absorbers or compression springs 31.

Having thus described our invention what we claim as new, is:—

1. The combination with the axles of a vehicle, of a frame adapted to support the body of said vehicle, said frame comprising parallel truss members, connections between the truss members, end springs supporting said connections, side springs flexibly connected at one end with said truss members and at the other with said end springs, blocks supported upon said axles and carrying the side springs, compression springs arranged between said blocks and the truss members, and anti-friction devices comprising rollers interposed between the said blocks and vertical portions of said truss members.

2. The combination with the axles of a vehicle, of a frame adapted to support the vehicle body, said frame comprising parallel side members composed of an upper truss element and a lower tie element, vertical connections between said elements bearing blocks supported on said axles, channels in said blocks adapted to be slidably engaged by the said vertical connections, series of anti-friction rollers in said channels, a compression spring in said block engaging said upper truss element, and springs carried on said blocks and supporting said frame.

3. The combination with the axles of a vehicle, of a slidable frame adapted to support the vehicle body, roller bearings engaging the axles, bearing blocks supported on said roller bearings, side springs carried by said blocks, flexible connections between said springs and the frame, and means for adjusting the blocks longitudinally on the frame.

4. The combination with the axles of a vehicle, of a slidable frame, said frame comprising side members having truss elements, means for adjusting said truss elements, bearing blocks supported on the axles, roller bearings between said blocks and axles, springs on said blocks, flexible connections between the springs and said frame, and means for adjusting the blocks longitudinally on the frame.

In testimony whereof we affix our signatures in the presence of two witnesses.

CLINTON C. JONES.
C. BRADNER JONES.

Witnesses:
CHAS. A. BROWN,
WM. DOLDE.